Sept. 1, 1942.　　　　G. H. LELAND　　　　2,294,787
APPARATUS FOR TESTING EYES
Filed Jan. 10, 1939　　　4 Sheets-Sheet 1
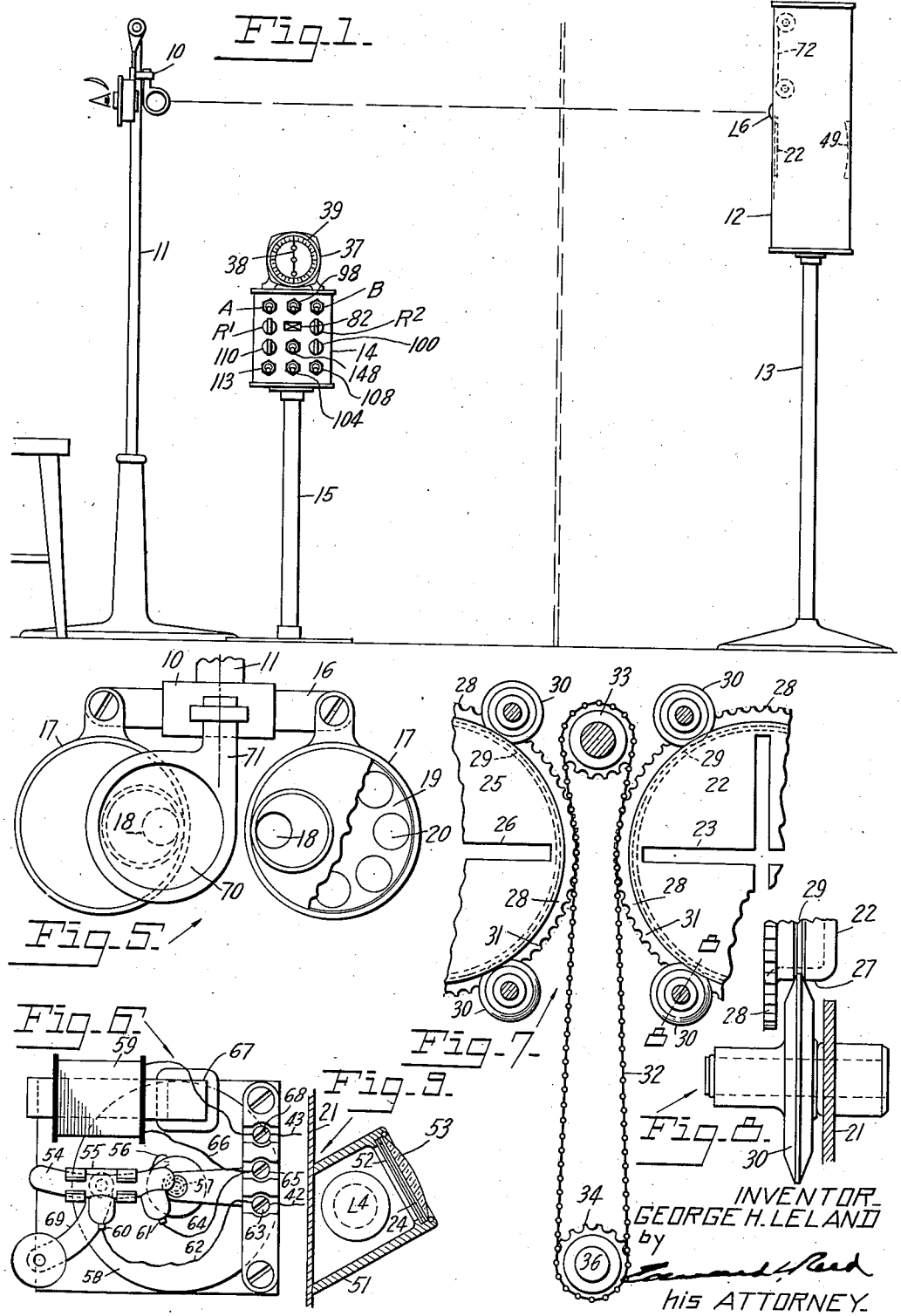
INVENTOR
GEORGE H. LELAND
by
his ATTORNEY

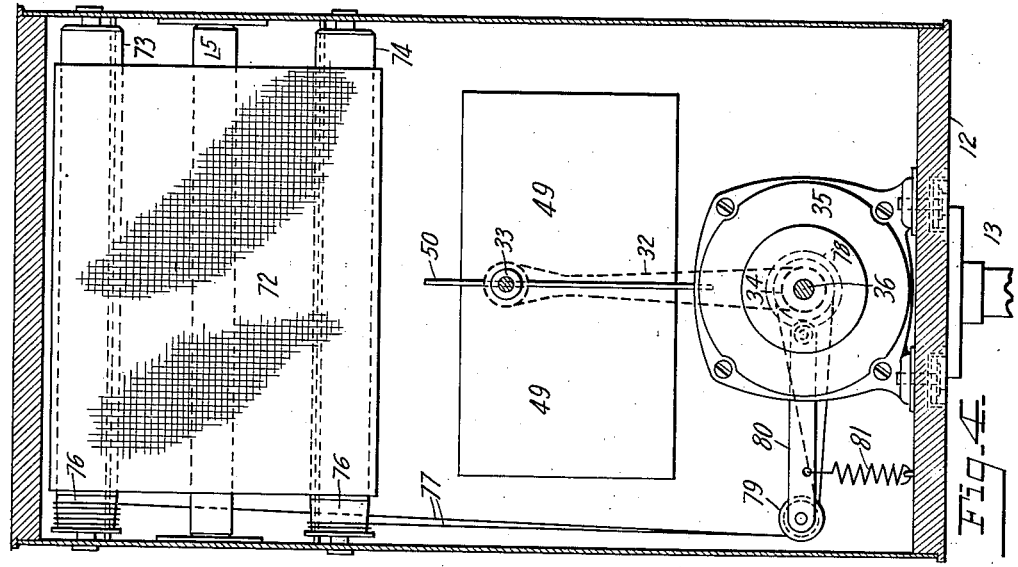
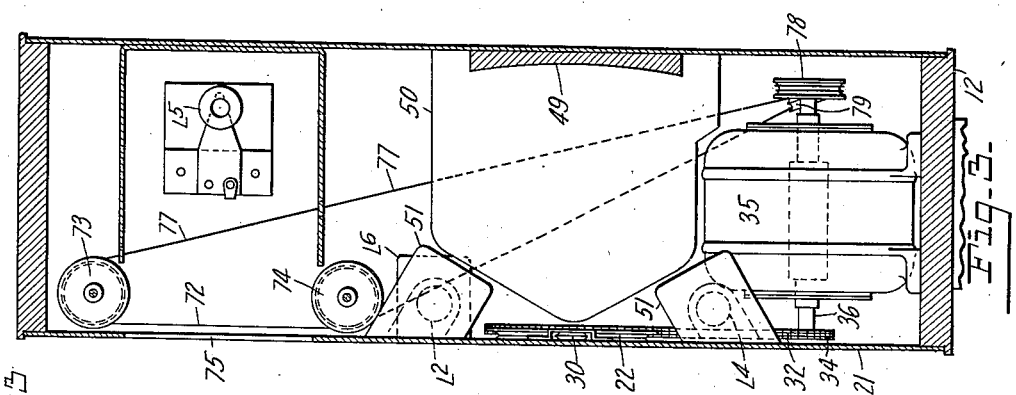
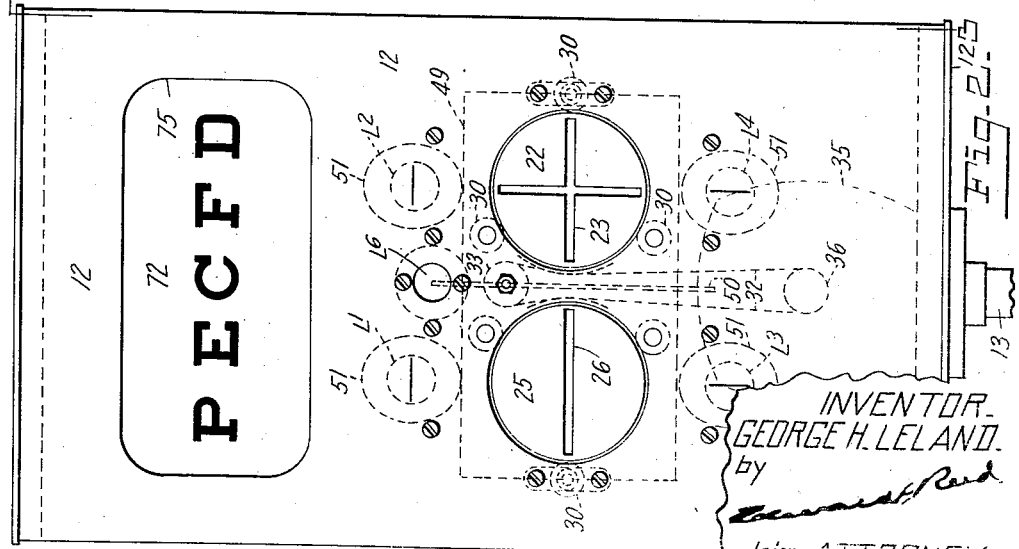

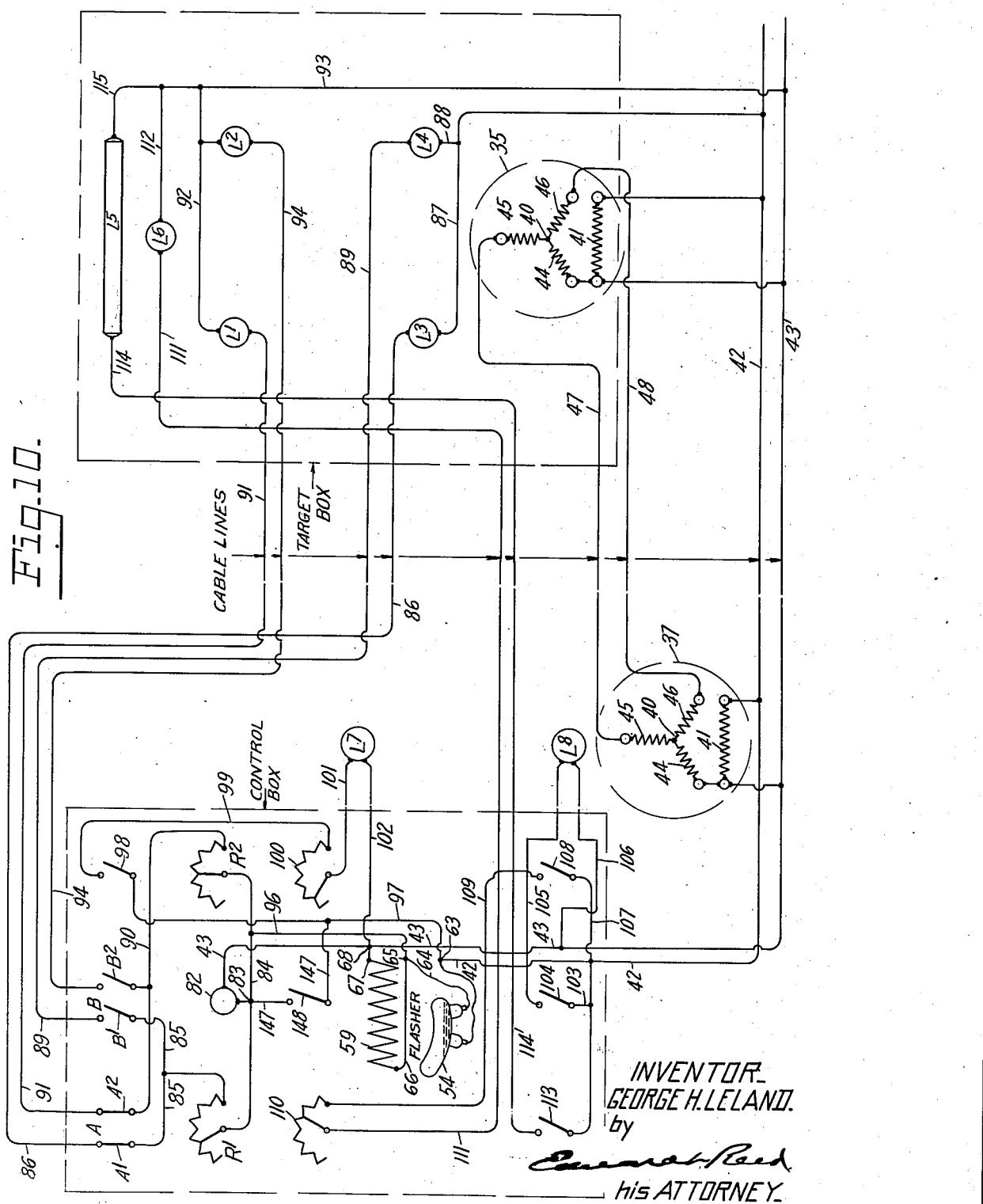

Sept. 1, 1942.    G. H. LELAND    2,294,787
APPARATUS FOR TESTING EYES
Filed Jan. 10, 1939    4 Sheets-Sheet 4
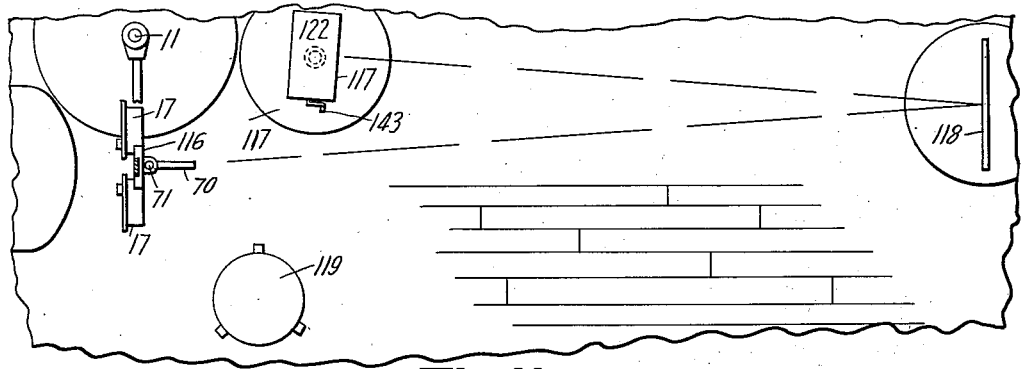
Fig. 11.
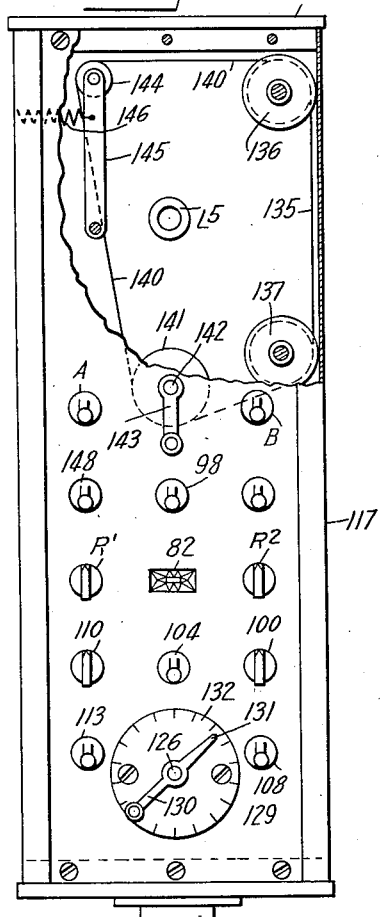
Fig. 13.
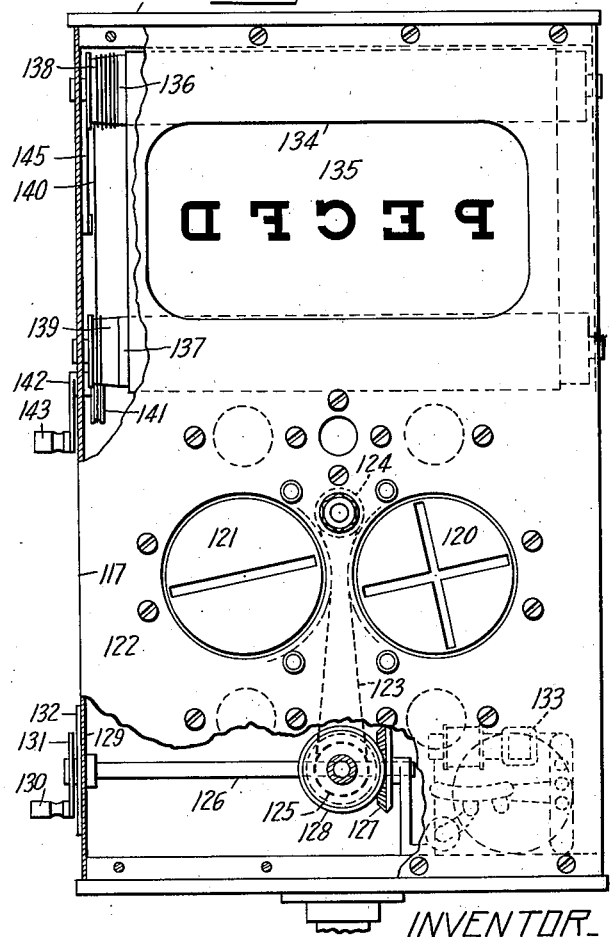
Fig. 12.
INVENTOR
GEORGE H. LELAND.
his ATTORNEY.

Patented Sept. 1, 1942

2,294,787

UNITED STATES PATENT OFFICE 2,294,787

APPARATUS FOR TESTING EYES

George H. Leland, Dayton, Ohio

Application January 10, 1939, Serial No. 250,131

2 Claims. (Cl. 88—20)

This invention relates to apparatus for testing eyes and is in the nature of an improvement on and a further development of the apparatus shown and described in Patent No. 1,986,002, granted to me January 1, 1935. In accordance with the disclosure of that patent an illuminated fixation object, or target, is arranged in line of vision of the patient, the object being preferably illuminated with a red light, as the red color has very little tendency to stimulate accommodation in the eye and enables the eye to be retained in a state of visual relaxation during the test or examination. The fixation object is illuminated alternately with a bright light and a dim light and during the dim illumination the patient sees the fixation object with both eyes, thus maintaining actual fusion or binocular single vision during the dim illumination. During the period of bright illumination the eye which is not being tested is occluded, so that the patient views the fixation object with only the eye which is being tested and can describe the same as it appears to that eye. The period of occlusion is of such duration that the occluded eye will retain the image of the fixation object throughout the period of occlusion, thereby maintaining a functional state of binocular single vision while corrective perception of the fixation object is limited to the eye being tested.

One object of the present invention is to provide improved means for occluding the eye which is not undergoing test; and to effect occlusion without interposing a moving part in the line of vision of the patient.

A further object of the invention is to provide improved means for periodically occluding the eye which is not being tested, in order to secure monocular vision of the fixation object by the eye being tested during the examination period, and for maintaining during the period of occlusion binocular vision or fusion.

A further object of the invention is to provide such an apparatus with an adjustable fixation object and simple and efficient means for adjusting the same from the operator's station near the patient.

A further object of the invention is to provide remotely controlled manually operated means for adjusting a movable fixation object.

A further object of the invention is to provide such an apparatus with a chart which is adjustable to exhibit different symbols thereon, and means for remotely controlling the position of said chart without the use of movable devices extending between the chart and the controlling station.

A further object of the invention is to provide such an apparatus in which the fixation object and chart will be mounted in the same casing and adjustable by manually operated means arranged exteriorly of said casing.

Other objects of the invention may appear as the method and apparatus are described in detail.

In the accompanying drawings Fig. 1 is an elevation of an installation of eye testing apparatus embodying my invention; Fig. 2 is a front elevation of the fixation objects and the supporting casing; Fig. 3 is a vertical section taken on the line 3—3 of Fig. 2; Fig. 4 is a front elevation of the casing with the front wall removed to show in elevation parts of the mechanism therein; Fig. 5 is an elevation of the trial lens support and analyzer; Fig. 6 is an elevation of the circuit controlling device or flasher; Fig. 7 is a detail view showing the mechanism for adjusting the fixation objects; Fig. 8 is a detail view of one of the supporting rollers for the fixation object; Fig. 9 is a sectional detail view of one of the light sources; Fig. 10 is a circuit diagram; Fig. 11 is a plan view of an installation utilizing a slightly modified form of the apparatus; Fig. 12 is a front elevation of the casing which supports the fixation objects and chart; and Fig. 13 is a side elevation of that casing.

In these drawings I have illustrated one form of apparatus for carrying out my improved method, together with a minor modification thereof, but it will be understood that this particular apparatus has been chosen for the purpose of illustration and that the apparatus may take various forms without departing from the spirit of the invention.

In the installation illustrated in Fig. 1 I have shown the apparatus as comprising a trial lens support 10 which is adjustably mounted on an upright standard 11. Arranged in line with and spaced from the trial lens support, preferably about twenty feet, is a casing 12 which carries the fixation object or objects and encloses parts of the controlling mechanism, this casing being preferably mounted on a standard 13. Arranged adjacent to the operator's station, usually near the trial lens support, is a control box 14 mounted on a standard 15 and containing various manually operated switches and other parts of the mechanism.

The trial lens support may be of any suitable character which will enable lenses of different values to be successively placed before the eye of the patient. It is here shown as a commercially known "Phoropter" and comprises a supporting member 16 extending transversely to the standard 11 and adjustably secured thereto and having at each end thereof a circular housing 17, each housing being provided in both walls thereof with alined openings 18, and the housings being adjustable to permit the openings 18 to be properly alined with the eyes of the patient. Rotatably mounted in each housing is a disk-like member 19 provided with an annular series of lenses 20, of different values, so arranged that any one of the lenses 20 may be brought into line with the openings 18. Usually two lens supporting members 19 are provided to secure a wider range of lens values.

The fixation object may be of any suitable character and may be supported in any desired manner. In the present instance it is mounted in the front wall 21 of the casing, or target box, 12, as shown at 22, and comprises a disk-like element of opaque material having openings, or translucent portions, shaped to provide a figure of sharp line demarcation, such as the intersecting slots 23. In the present apparatus I have provided two fixation objects which are identical in construction with the exception of the figure, the second object, 25, being provided with a single diametrical slot 26 instead of the cross slots 23. The two fixation objects are never used at the same time and the second one is provided merely for the purpose of enabling the examination to be conducted with different figures without the necessity of modifying the figure, as is necessary when a single fixation object is used. Both fixation objects are rotatably mounted to enable the positions of the respective figures to be altered in the course of the examination and, as here shown, each fixation object comprises a rearwardly extending peripheral portion 27 havnig at its rear edge a vertical annular flange 28. The circumferential portion 27 is provided with a groove 29 with which engages a plurality, in the present instance three, supporting rollers 30 which are rotatably mounted on the front wall 21 of the casing, the several rollers being so arranged as to support the fixation object for rotation about a fixed axis without the use of a shaft. The fixation objects may be rotatably adjusted in various ways. In the present instance, I have provided a single adjusting device for simultaneously actuating both fixation objects. For this purpose the flange 28 of each fixation object is provided with teeth 31 to impart to it the form of a sprocket wheel and the sprocket wheels of the two fixation objects engage oppositely moving portions of a sprocket chain 32 which extends about an idler, or sprocket wheel, 33 mounted on the front wall of the casing above the points of contact of the chain with the teeth 31, and also about a lower sprocket wheel 34 mounted on the front wall of the casing near the lower end thereof. This sprocket wheel 34 may be actuated in any suitable manner but is preferably remotely controlled as will be hereinafter described. Inasmuch as adjacent portions of the sprocket wheels of the two fixation objects engage the oppositely moving stretches of the chain 32 it will be apparent that both fixation objects will be rotated in the same direction and at the same time but inasmuch as only one object is used, and therefore only one object is illuminated, the simultaneous movement of the two objects is not objectionable, as the unilluminated object will not be visible to the patient. The simultaneous adjustment of the two fixation objects by the same actuating device enables a single remote indicator to indicate the position of whichever object is being used, and when the two objects are used alternately this is a distinct advantage.

To enable the operator to adjust the fixation object from his station adjacent the trial lens support I prefer to employ as the adjusting means self-synchronizing devices or motors of well known kind. These motors are separately connected with the current supply line and are so connected with the current supply line and are connected one with the other that when the rotor in one motor is adjusted the rotor of the other motor will be correspondingly adjusted. In the present arrangement one of these motors, shown at 35, is mounted in the casing 12 and its rotor shaft 36 has secured thereto the lower sprocket wheel 34 of the actuating device for the fixation objects. The second motor, 37, which may be called the transmitter, is shown as mounted on the control box 14 adjacent the operator's station and its rotor is provided with a manually actuated device, such as a finger piece 38, whereby it may be rotated, and this finger piece also constitutes a pointer which travels over a series of graduations 39 to indicate the position of the rotor, and, therefore, the positions of the fixation objects. By reference to the circuit diagram of Fig. 10 it will be noted that each motor comprises a stator 40 and a rotor 41. Each rotor winding is connected across the main electrical supply line, which is here shown as comprising conductors 42 and 43. The stator comprises three windings, 44, 45 and 46. The winding 44 of each motor is connected with the conductor 43 of the main line, the windings 45 of the two motors are connected by a conductor 47 and the windings 46 of the two motors are connected one to the other by a conductor 48. The construction and operation of these self-synchronizing motors being well known it is not necessary to further describe the same but it will be understood that when the rotor of the transmitting motor 37 is rotated to a selected position the rotor of the second or actuating motor 35 will be moved to exactly the same position and this movement will be imparted to the fixation object or objects. Thus the operator can, from his station, manipulate the transmitting motor to accurately adjust and indicate the position of the fixation object.

Means are provided for alternately illuminating the fixation object with light polarized on different axes. Preferably this is accomplished by providing two sources of light for illuminating each fixation object, polarizing the light from one source on one axis and polarizing the light from the other source on an axis intersecting the first axis, and then alternately energizing the light sources. In the arrangement shown in Figs. 2 and 3, the light sources are supported at the front of the casing 12 on opposite sides of the fixation object and are so arranged that the light from each source will be directed onto a screen having a metallic surface, such as a silver screen 49, supported in the rear portion of the casing in line with the fixation object. In the present instance the screens for the two fixation objects are formed in one piece, as shown in Fig. 4, and divided into two parts by a vertical partition 50 which extends forwardly from the back wall of the casing to confine the light from the light sources for each fixation object to a single portion of the screen. In the construction illustrated each fixation object is provided with two electric lamps arranged above and below the same, the lamp $L^1$ being arranged above the fixation object 25 and the light $L^3$ being arranged below that object, and the lamp $L^2$ being arranged above the fixation object 22 and the lamp $L^4$ being arranged below that object. Each lamp is enclosed in a tubular housing 51 and the housings for the lamps of each pair converge rearwardly so that the light of each is directed against the screen 49, the latter preferably having a concave front surface to cause the light to be diffused substantially uniformly over the rear surface of the fixation object so as to illuminate the translucent portions thereof. Mounted in each lamp housing, between the lamp and the screen, is a light polarizing element 52 which may be of any suitable character, such as the polarizing material known commercially as Polaroid. In the present arrangement a lens 53 is mounted in the inner end of each housing beyond the light polarizing element. The fixation object is preferably illuminated with a red light and for this purpose I have shown a color screen 24 arranged in each lamp housing between the lamp and the polarizing element (Fig. 9), but this color screen may be arranged in any suitable location, as by applying it to the fixation object. The polarizing elements for each pair of lamps have their axes of polarization arranged in intersecting relation, the axes being preferably at right angles one to the other. In the present arrangement the polarizing elements for the upper lamps $L^1$ and $L^2$ have their axes of polarization in substantially horizontal planes, while the polarizing elements for the lamps $L^3$ and $L^4$ have their axes of polarization in substantially vertical planes. Thus when the lamp $L^2$ is energized or illuminated the fixation object will be illuminated with light polarized on a horizontal axis and when the lamp $L^4$ is energized the fixation object will be illuminated with light polarized on a vertical axis.

The lamps of each pair may be alternately energized in any suitable manner but, in the present arrangement I have utilized for that purpose a circuit controlling device or flasher of the type shown and described in Patent No. 2,032,326, granted to me February 25, 1936. As shown in Fig. 6 this flasher comprises a mercury tube switch 54 mounted on a pivoted supporting arm 55 having at one end thereof a toothed segment 56 which meshes with a pinion 57 on the axis of a rotatable disk 58, this disk constituting both the armature of an induction motor and an inertia wheel. The upper portion of the disk is arranged between the poles of an electromagnet 59 which, when energized, will impart rotation to the disk. The switch 54 is provided with two terminals 60 and 61, the terminal 60 being connected by a conductor 62 with a terminal 63 with which is connected the conductor 42 of the main line. The terminal 61 is connected by a conductor 64 with a terminal 65 and one end of the magnet winding is connected by a conductor 66 with the terminal 65, the other end of the magnet winding being connected by a conductor 67 with a terminal 68 with which is connected the other conductor 43 of the main line. That end of the switch supporting arm 55 which is provided with the segment 56 is of such weight that, when free to move, the segment and switch will move downwardly to close the switch. Preferably the arm is counterbalanced by a weight 69 which is adjustable to different positions to regulate the speed with which the switch moves from one position to the other, this adjustment serving in part to control the duration of the open and closed periods of the switch. The lamps of the several light sources are connected with the main circuit in a manner, to be hereinafter described, which will cause the lamps of each pair to be alternately energized by the movement of the flasher switch. It is also desirable that the energization of the light sources shall be so controlled as to provide alternate bright illumination and dim illumination of the fixation object. For this purpose resistance is interposed in the lamp circuits to provide a dim illumination when the flasher switch is opened and to cut out that resistance and provide bright illumination when the flasher switch is closed. In the present instance this resistance is so arranged that the upper lamp $L^2$, or the upper lamp $L^1$, as the case may be, will be brightly illuminated when the switch is closed and the lower lamp, $L^4$ or $L^3$, will be dimly illuminated when the switch is opened.

In an examination of the eyes it is highly desirable to maintain fusion of the patient's vision on the fixation object and at the same time to secure corrective perception of the object only with the eye which is being tested. For this purpose the fixation object is alternately illuminated with a bright light and a dim light and the eye which is not undergoing test is occluded during the bright illumination. In my Patent No. 1,986,002 the occlusion is effected by a magnetically operated disk which oscillates into and out of the line of vision of the eye not under test. In the present instance occlusion is secured by the use of polarized light and in addition to illuminating the fixation object alternately with light polarized on different axes there is arranged between the eye which is not under test and the fixation object a second light polarizing device, commonly called an analyzer, the axis of polarization of which is at substantially right angles to the axis of polarization of the bright light, thus preventing the eye not under test from seeing the fixation object when it is brightly illuminated but permitting the patient to see that object with both eyes during the period of dim illumination. In the apparatus here illustrated the analyzer is shown at 70, in Fig. 5, and is carried by a frame 71 pivotally mounted on the trial lens supporting element 16 for movement into alinement with the opening 18 of either trial lens housing 17. This analyzer has a vertical axis of polarization which, of course, is at substantially right angles to the horizontal axis of polarization of the upper light source but is parallel with the vertical axis of polarization of the lower light source. The analyzer may be positioned in front of either trial lens housing or it may be arranged edgewise between said housings to permit the patient to have unrestricted vision of the fixation object with both eyes.

The examination with the apparatus here illustrated is conducted in much the same manner as with the apparatus of the above mentioned Patent No. 1,986,002. The patient is seated facing the fixation object, the analyzer is placed in front of the eye which is not being tested and the sharp line figure of the fixation object is illuminated alternately by a bright light and a dim light, the bright light being polarized on an axis the plane of which intersects the plane of the axis of polarization of the analyzer, so that during the period of bright illumination the illuminated figure is not visible to the eye which is not being tested. The eye being tested is examined during the period of bright illumination while the illuminated figure is not visible to the other eye. It will be understood that it is important that during the period of examination the illuminated figure should be visible only to the eye which is being tested because if it was visible to both eyes there would be no way of determining which eye was responsible for any distortion of the figure as it appeared to the patient. The interval of dim illumination provides a period of rest during which the eye being tested is relieved of any strain which might result from continuously viewing the illuminated figure, and also establishes binocular vision or fusion as both eyes then view the fixation object. The period of bright illumination should be of sufficient duration to permit the patient to observe the illuminated figure with sufficient care to enable him to describe the same as it appears to him after each change in trial lenses. Usually from one to two seconds is sufficient and does not subject the eye to strain.

While it is preferable that the figure be illuminated with a bright light and a dim light polarized on different axes this is not essential. If the dim illumination was effected with unpolarized light the fixation object would be visible to both eyes of the patient during the dim illumination and fusion would be maintained, but the use of polarized light for the dim illumination maintains the light at substantially equal brilliancy. When, as is frequently the case, the examination is conducted in a room having a subdued light to enable the patient to see the fixation object in the absence of illumination, the relatively dim room light may take the place of the dim illumination and separate dim illumination of the translucent figure will be unnecessary.

In the examination of eyes it is frequently necessary to present to the vision of the patient a chart having thereon a plurality of series of symbols, such as letters, the symbols of the several series being different in size. It has been proposed heretofore to provide such a chart in the form of an elongate strip mounted on rollers so that by winding the strip onto or off of the rollers the desired series of symbols could be presented to the eye. However, no satisfactory means has been provided whereby such a chart could be adjusted from the operator's station. The present apparatus includes a roll supported chart of this kind the adjustment of which is remotely effected by the use of the self-synchronizing motors. As shown in Figs. 3 and 4 the chart comprises an elongate strip 72 on which the series of symbols are printed and which is wound on rollers 73 and 74 arranged respectively above and below a sight opening 75 in the front wall of the casing, that portion of the chart which is exposed through the opening being illuminated by a lamp $L^5$ in the rear of the chart. The end portions of the rollers 73 and 75, at one side of the chart, constitute pulleys 76 on which the end portions of a cable 77 are wound, the ends of the cable being secured to the respective pulleys. The intermediate portion of this cable is wound about a pulley 78 secured to the rotor shaft of the motor 35, which is mounted in the casing 12, and the rotation of the rotor in either direction will wind the chart onto one roller and off of the other. The present arrangement of the motor 35 is such that in order to support the cable 77 in its proper relation to the other mechanism I have passed the cable about pulleys 79 carried by the free end of an arm 80 pivotally mounted on the rotor shaft 36. This arm 80 is acted upon by a spring 81 which in connection with the weight of the arm serves to maintain both the cable and the chart taut.

Referring now to the circuit diagram of Fig. 10 it will be noted that the main line conductor 42 terminates at the terminal 63 where it is connected with the flasher; but the conductor 43 extends beyond the terminal 68, where it is connected with the flasher, to a pilot lamp 82 which is connected at 83 with a conductor 84, one end of which is connected with a rheostat $R^1$ and the other end of which is connected with a rheostat $R^2$. The rheostats $R^1$ and $R^2$ are adapted to be connected in circuit with the bright and dim lights of either of the two fixation objects, 22 and 25, these connections being controlled by switches A and B. The rheostat $R^1$ is connected with a conductor 85 which in turn may be connected by a switch element A' with a conductor 86 leading to the dim lamp $L^3$ of the fixation object 25, the lamp $L^3$ being connected by a conductor 87 with the main line conductor 42. The conductor 85 is also adapted to be connected by a switch element B' with a conductor 89 leading to the dim lamp $L^4$ of the fixation object 22, the lamp $L^4$ being connected by conductors 88 and 87 with the conductor 42 of the main line. The rheostat $R^2$ is connected with a conductor 90 which in turn is adapted to be connected by a switch element $A^2$ with a conductor 91 leading to the bright lamp $L^1$ of the fixation object 25, this lamp being connected by conductors 92 and 93 with the conductor 43 of the main line. The conductor 90 is also adapted to be connected by a switch element $B^2$ with a conductor 94 leading to the bright lamp $L^2$ of the fixation object 22, the lamp $L^2$ being connected by conductor 92 with the conductor 93 leading to the main line conductor 43. It will be understood that one of the switches, A or B, will be closed and the other switch opened depending upon which fixation object is to be used. Assuming that the cross line fixation object 22 is to be used, the switch elements B' and $B^2$ will be closed and when the flasher switch 54 is opened the current will flow from the main line conductor 42 through conductor 88, lamp $L^4$, conductor 89, switch element B', conductor 85, rheostat $R^1$, conductor 84, pilot light 82, to the main line conductor 43. A portion of the current will flow around the lamp 82 to conductor 96 leading from the conductor 84 to the terminal 65 of the flasher magnet and then through that magnet to the main line conductor 43, and a further portion of the current from conductor 84 will flow through the rheostat $R^2$, conductor 90, switch element $B^2$, conductor 94, lamp $L^2$, and conductors 92 and 93 to the main line conductor 43. Thus when the flasher switch is open current will flow through the lamp $L^4$, magnet 59, pilot light 82, and lamp $L^2$. As a result the lamp $L^4$ will be dimly illuminated but the division of the current between the magnet coil and lamps 82 and $L^2$ will so reduce the same that neither the magnet nor the lamps will be energized sufficiently to actuate the switch or to illuminate the lamps. When the flasher switch is closed current will flow from the line 42 through the flasher switch 54, terminal 65 and conductor 96 to the conductor 84 and thence to the rheostat R², conductor 90, switch element B² and conductor 94 to the lamp L² and will brightly illuminate that lamp. A portion of the current will pass through the flasher magnet 59 to the conductor 43 at the terminal 68, and another portion of the current will pass from the conductor 84 through the pilot lamp 82 to the conductor 43, thus illuminating the pilot lamp when the bright lamp is illuminated. The pilot lamp may conveniently be mounted on the control box 14. The energization of the flasher magnet will cause the flasher switch to be again opened, thus releasing the inertia wheel and permitting it to move the switch again to its closed position.

When it is desired to employ the fixation object 25, having the single slot, the switch B is opened and the switch A is closed. The current then flows in the same manner as above described except that it flows from the conductor 85 through switch element A' and conductor 86 to the lamp L³, and through the conductor 90, switch element A² and conductor 91 to the lamp L¹.

To enable the bright illumination of the fixation object to be maintained independently of the flasher, when desired, the conductor 91 is connected with the conductor 84 by a conductor 147 and a normally open switch 148, whereby the closing of the switch 148 will connect conductor 84 directly with the main line conductor 42.

It is sometimes desirable in the course of an examination to present to the eyes of the patient a small fixation object spaced a relatively short distance from the eyes. Such fixation objects may correspond respectively to the fixation devices 22 and 25 except that they would not be adjustable, and the circuit of Fig. 10 is provided with lamps L⁷ and L⁸ to illuminate such small fixation objects. Further, these lamps are not flashed and, as shown in Fig. 10, a conductor 97 leads from the main line conductor 42 at the terminal 63 through a manually operated switch 98 and conductor 99 to a rheostat 100 which is connected by a conductor 101 with the lamp L⁷ and this lamp is connected by a conductor 102 with the main line conductor 43 at the terminal 68, thus enabling the lamp to be illuminated by the manual manipulation of the switch 98 independently of the flasher. The lamp L⁸ is connected in a circuit including a conductor 103 connected with the main line conductor 42 and connected by a switch 104 with a conductor 105 leading to the lamp L⁸ and that lamp is connected by a conductor 106 with the main line conductor 43. The apparatus may also be provided with a small circular fixation object including a lamp L⁶. This lamp is included in a circuit comprising a conductor 107 connected with the main line conductor 42 and connected by a switch 108 with a conductor 109 leading to a rheostat 110. The rheostat is connected by a conductor 111 with the lamp L⁶ which in turn is connected by a conductor 112 with conductor 93 leading back to the main line conductor 43. The lamp L⁵ for illuminating the chart 73 is included in a circuit comprising the conductor 103 which is connected by a switch 113 with a conductor 114 leading to the lamp L⁵ and this lamp is connected by a conductor 115 with the conductor 93.

Under some circumstances it may be desirable to so arrange the apparatus that the patient will view the fixation object as reflected in a mirror instead of viewing the same directly and an installation of the apparatus for this purpose is shown in Fig. 11. With such installation the casing for the fixation object, or the target box, will ordinarily be arranged close to the operator's station and it is therefore unnecessary to provide remote controlling means for the fixation object and the chart. In Fig. 11 the trial lens support is shown at 116. A casing or target box 117 is arranged adjacent to the trial lens support with its front wall, which carries the fixation objects, facing a mirror 118. The operator's station is indicated by a stool 119 arranged adjacent to both the trial lens support and the target box. While the particular arrangement is a desirable one it will be obvious that the several parts of the apparatus may be arranged in any convenient manner. As shown in Fig. 12 two fixation objects 120 and 121, similar to those above described, are mounted in the front wall 122 of the casing 117 and are actuated by a sprocket chain 123, the oppositely moving stretches of which actuate the respective fixation objects, this chain being mounted on an upper sprocket wheel 24 and a lower sprocket wheel 125. Inasmuch as the casing is so located that it is within convenient reach of the operator from his normal station the remote control is unnecessary and the self-synchronizing motors have been omitted and in lieu thereof there is mounted in the lower part of the casing an actuating shaft 126 to which is secured a beveled gear 127 which meshes with a beveled gear 128 secured to the lower sprocket wheel 125. One end of the shaft 126 projects through the side wall 129 of the casing and has secured thereto a suitable operating device, such as a handle 130, and connected with the handle is a pointer 131 which travels over a series of graduations on a dial 132 to indicate to the operator the position of the fixation object. It is desirable that the reflection of the fixation object in the mirror should rotate in the same direction that the handle 130 rotates. For this reason the gearing which connects the actuating shaft with the sprocket wheel 125 of the adjusting device is so arranged that the fixation object will rotate in a direction opposite the direction in which the handle 130 is rotated, that is, when the handle is rotated clockwise in Fig. 13, the fixation object will rotate counterclockwise in Fig. 12, thus causing the reflection of the fixation object as it appears in the mirror to rotate clockwise. The means for controlling the illumination of the fixation object alternately with bright and dim polarized light is the same as above described but the circuit controlling device or flasher is mounted in the casing 117, as shown at 133.

The front wall of the casing 117 is provided with a sight opening 134 and a chart 135 is wound on rollers 136 and 137 for movement across the opening 134 and these rollers are provided with pulleys 138 and 139, all in the manner above described. The actuating means for the rollers comprises a cable 140, the end portions of which are secured to and wound about the respective rollers 136 and 137. The intermediate portion of this cable 140 is wound about a pulley 141 mounted within the casing and, in the present instance, arranged adjacent to the lower roller 137. This pulley is mounted on a short shaft 142 which extends through the side wall 129 of the casing and has secured thereto a suitable operating device such as a handle 143 by means of which the chart can be adjusted. The cable also passes about a pulley 144 which is supported by a pivoted arm 145 and is pressed against the cable by a spring 146, acting on the arm, to maintain the cable and the chart taut.

By mounting the actuating devices for the fixation objects and the chart on the side wall 129 of the casing these actuating devices are arranged in front of and within easy reach of the operator while the front wall of the casing, and the fixation objects and chart, face the mirror. The manually operated switches for controlling the various circuits are also mounted on this side wall 29 of the casing, thus eliminating the use of a separate control box.

While I have described the preferred method for carrying out my invention and one form of apparatus for performing that method, together with a minor modification thereof, I wish it to be understood that I do not desire to be limited to the details thereof as various modifications may occur to a person skilled in the art.

Having now fully described my invention, what I claim as new and desire to secure by Letters Patent, is:

1. In an apparatus for testing eyes, a fixation object suitable for determining refractive errors in vision and arranged to be perceived by both eyes of the patient, said fixation object comprising a structure of opaque material having a translucent figure of sharp line demarcation, a reflector arranged to reflect light onto the rear side of said fixation object and thereby illuminate said translucent figure, means for projecting onto said reflector alternately and at regular intervals a bright light and a dim light, means for polarizing said bright light on a given axis, and an analyzer arranged in front of said fixation object in the line of vision of the eye which is not being tested and having its axis of polarization in a plane intersecting the plane of the axis of polarization of said bright light to substantially exclude said figure from the vision of said eye during the interval of bright illumination, said figure being at all times visible to the eye which is being tested.

2. In an apparatus for testing eyes, a fixation object suitable for determining refractive errors in vision and arranged to be perceived by both eyes of the patient, said fixation object comprising a substantially opaque structure having an opening forming a figure of sharp line demarcation, means for illuminating said figure only of said fixation object alternately and at regular intervals during the testing of each eye with a bright light polarized on a given axis and with a dim light polarized on a different axis, each interval of bright illumination being of sufficient duration to permit the eye which is being tested to determine the exact appearance of the illuminated figure, and an analyzer arranged in front of said fixation object in the line of vision of the eye not being tested and having its axis of polarization in a plane intersecting the plane of the axis of polarization of said bright light and parallel with the plane of the axis of polarization of said dim light, the eye which is being tested having continuous unobstructed vision of said figure, whereby said illuminated figure will be visible to both eyes during the interval of dim illumination and will be substantially invisible to the eye which is not being tested during the interval of bright illumination.

GEORGE H. LELAND.